United States Patent [19]

Obara et al.

[11] Patent Number: 4,967,054

[45] Date of Patent: Oct. 30, 1990

[54] ELECTRIC-DISCHARGE-MACHINING POWER SOURCE

[75] Inventors: Haruki Obara, Toyama; Syunzo Izumiya, Fujiyoshida, both of Japan

[73] Assignee: Fanuc Ltd, Minamitsuru, Japan

[21] Appl. No.: 381,393

[22] PCT Filed: Feb. 2, 1989

[86] PCT No.: PCT/JP89/00108

§ 371 Date: Jul. 3, 1989

§ 102(e) Date: Jul. 3, 1989

[87] PCT Pub. No.: WO89/07030

PCT Pub. Date: Aug. 10, 1989

[30] Foreign Application Priority Data

Feb. 4, 1988 [JP] Japan ................................. 53-22906

[51] Int. Cl.$^5$ ................................................ B23H 1/02
[52] U.S. Cl. ............................ 219/69.13; 219/69.18; 323/271
[58] Field of Search ..................... 219/69.13, 69.18; 323/271

[56] References Cited

FOREIGN PATENT DOCUMENTS

| | | | |
|---|---|---|---|
| 56-27734 | 3/1981 | Japan | 219/69.13 |
| 123218 | 7/1985 | Japan | 219/69.13 |
| 155321 | 8/1985 | Japan | 219/69.13 |
| 180720 | 9/1985 | Japan | 219/69.13 |
| 180721 | 9/1985 | Japan | 219/69.13 |
| 207720 | 10/1985 | Japan | . |

*Primary Examiner*—A. D. Pellinen
*Assistant Examiner*—Geoffrey S. Evans
*Attorney, Agent, or Firm*—Staas & Halsey

[57] ABSTRACT

An electric-discharge-machining power source in an electric discharge machine, which is capable of generating machining pulses each having a large peak value and a small pulse width, thereby attaining an improved machining speed. In the electric-discharge-machining power source, when supply of a power source voltage in between a workpiece (W) and a tool electrode (P) is prohibited by transistors (T1, T2), a generated return current attributable to energy accumulated in stray inductances (L1, L2) is returned to a high-voltage smoothing capacitor (C2) through return diodes (D1, D2). This allows the capacitor to be charged up to a voltage exceeding the power source voltage. As a result, the return current falls rapidly. In response to an output from a comparator (1) generated when a divided voltage (VH) corresponding to the capacitor charge voltage exceeds a reference voltage (VL), a transistor (T3) is rendered to be conductive. This allows the electric charge accumulated in the capacitor to be returned to a power-source-voltage smoothing capacitor (C1) through the transistor and an impedance (Z).

1 Claim, 2 Drawing Sheets

G1,G2 i₁ i₂ i, $V_L$, $V_H$

G3

ELECTRIC-DISCHARGE-MACHINING POWER SOURCE

BACKGROUND OF THE INVENTION

The present invention relates to an electric-discharge-machining power source for use in an electric discharge machine, and more particularly, to a transistor type electric-discharge-machining power source which is capable of increasing a machining speed.

In order to increase a machining speed in electric discharge machining, it is desirable to use machining pulses which are large in peak value but small in pulse width. Conventionally, a capacitor type electric-discharge-machining power source is employed so as to generate machining pulses which satisfy the aforementioned requirement. Recently, a transistor type electric-discharge-machining power source has been employed which has an electric current return circuit for protecting a transistor from a surge current (which is generated attributable to energy, accumulated in a stray inductance in a discharge circuit of the electric-discharge-machining power source) when the transistor is turned off.

However, it is difficult to generate machining pulses having a large peak value and a small pulse width in the transistor type electric-discharge-machining power source since restrictions are found in increasing a power source voltage and decreasing a stray inductance.

SUMMARY OF THE INVENTION

The object of the present invention is to provide an electric-discharge-machining power source in an electric discharge machine, which is capable of generating machining pulses having a large peak value and a small pulse width, thereby attaining an improved machining speed.

In order to achieve the above-mentioned object, an electric-discharge-machining power source of the present invention comprises: electric power source means; switching means for permitting and prohibiting an application of an electric power voltage from the electric power source means in between a workpiece and a tool electrode; a capacitor arranged to be charged up to a voltage beyond the electric power voltage; and a return circuit for returning a return electric current to the capacitor to charge the same capacitor. The return electric current is generated due to presence of a stray inductance of a discharge circuit when the application of the electric power voltage is prohibited by the switching means.

As mentioned above, according to the present invention, a return electric current (which is generated due to the presence of energy accumulated in the stray inductance of the discharge circuit of the electric-discharge-machining power source when the application of the electric power voltage in between the workpiece and the tool electrode is prohibited by the switching means) is returned to the capacitor so as to charge the same capacitor up to a voltage beyond the electric power voltage. Accordingly, it is possible to cause a return electric current to fall rapidly, and generate machining pulses having a large peak value and a small pulse width, so that an improved machining speed is attained.

DESCRIPTION OF THE PREFERRED EMBODIMENT

Prior to an explanation of the present invention being given, a conventional transistor type electric-discharge-machining power source, having an electric current return circuit for transistor protection, will be explained with reference to FIGS. 4 and 5.

Figure 4:
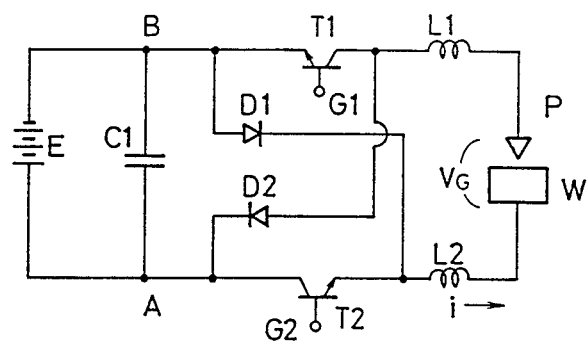
FIG. 4 is a circuit diagram of a conventional electric-discharge-machining power source.
Figure 5A:
FIGS. 5A and 5B are timing diagrams of a relationship between a pulse train for ON/OFF control of a transistor and an electric discharge current in the arrangement of FIG. 4.
Figure 5B:

A machining power source shown in FIG. 4 comprises transistors T1 and T2 each having a base to which a common pulse train G1 and G2 (FIG. 5A) is applied. When the transistors T1 and T2 are turned ON, a voltage VO across terminals of an electric power source E is applied in between a workpiece W and a tool electrode P so that an electric discharge occurs therebetween, accompanied with generation of an electric discharge current i. The differential value of the electric discharge current i with respect to time is represented by the following equation (1). The electric discharge current i increases linearly with elapse of time, as shown in FIG. 5B.

$$di/dt = (VO - VG)/(L1 + L2) \quad (1)$$

where VG represents a gap voltage between the workpiece W and the electrode P, and L1 and L2 each represent a stray inductance of a discharge circuit of the electric-discharge-machining power source, respectively.

When the transistors T1 and T2 are turned OFF, the electric discharge current i, which is generated attributable to energy accumulated in the stray inductances L1 and L2, flows between the workpiece W and the electrode P through a capacitor C1 for smoothing the power source voltage and diodes D1 and D2 for electric current return. As shown in FIG. 5B, this discharge current i decreases linearly with the elapse of time, in accordance with the following equation (2).

$$di/dt = (-VO - VG)/(L1 + L2) \quad (2)$$

After all, when the transistors T1 and T2 are turned ON and OFF, a machining pulse is generated, which is a triangular in waveform which assumes a peak value upon the transistors being turned OFF and is symmetric with respect to the point of time at which the peak value appears.

As apparent from equation (1), the larger the power source voltage VO gets, the steeper the rise of the electric discharge current i will be, so that the peak value of the discharge current will increase. However, conventionally, it is difficult to generate machining pulses having a large peak value and a small pulse width in a transistor type electric-discharge-machining power source accompanied with restrictions in increasing the power source voltage VO and decreasing the stray inductances L1 and L2.

Figure 2A:
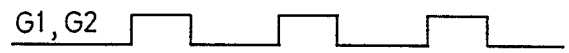
Figure 2B:
Figure 2C:
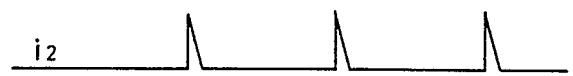
Figure 2D:
Figure 2F:
Figure 3:
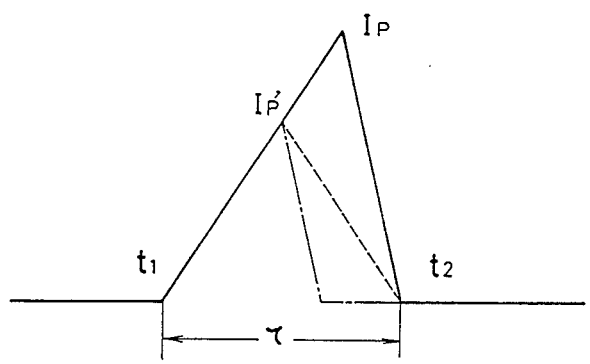
FIG. 3 is a waveform diagram of an electric discharge current in the arrangement of FIG. 1 in a comparison to that of a conventional arrangement.

In the following, with reference to FIGS. 1-3, a transistor type electric-discharge-machining power source according to an embodiment of the present invention will be explained.

Figures 1, 2E:
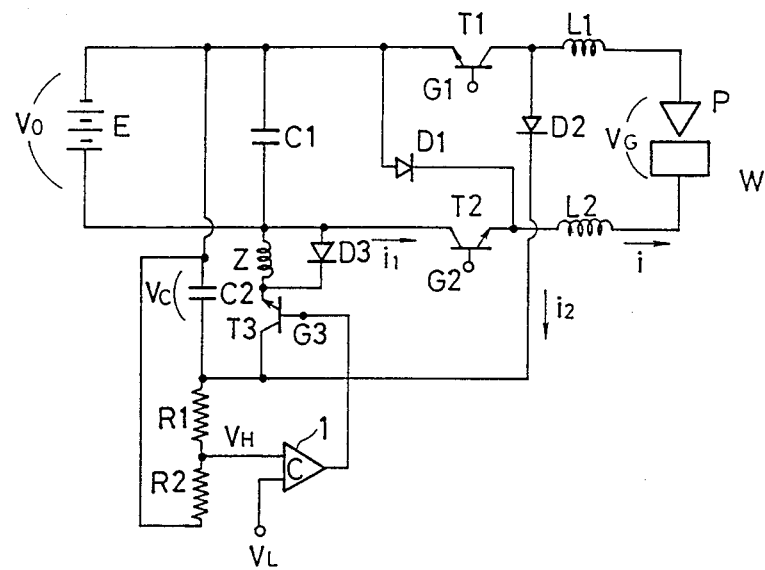
FIG. 1 is a circuit diagram of an essential part of an electric-discharge-machining power source according to an embodiment of the present invention.
FIGS. 2A to 2F are timing diagrams of a relationship among various signals appearing at various portions of FIG. 1.

Referring to FIG. 1, the electric-discharge-machining power source is basically constructed in the same manner as the arrangement of FIG. 4. That is, the electric-discharge-machining power source comprises an electric power source E and a capacitor C1 connected in parallel therewith for smoothing the power source voltage. The power source E has its positive terminal connected to the workpiece W through a transistor T2, and its negative terminal connected to the tool electrode P through a transistor T1 which cooperates with another transistor T2 to form switching means. These transistors T1 and T2 each have a base supplied from a control circuit (not shown) with a pulse train G1 and G2 for control of a transistor ON-OFF operation. A diode D1 for electric current return has its anode connected to a lead wire which connects the negative terminal of the power source E with the emitter of the transistor T1. Further, the anode of an electric current returning diode D2 is connected to another lead wire which connects the collector of the transistor T1 with the electrode P. In FIG. 1, reference symbols L1 and L2 represent stray inductances of a discharge circuit of the electric-discharge-machining power source, and VO and VG represent the power source voltage and the gap voltage, respectively.

An essential part of the electric-discharge-machining power source will be explained herein below.

Reference symbol C2 indicates a high-voltage smoothing capacitor having one end connected to the negative terminal of the power source E and another end connected to the cathode of the diode D2. Connected to the capacitor C2 in parallel therewith is a voltage divider consisting of resistors R1 and R2 whose junction is connected to one input terminal of a comparator 1 having another input terminal to which a reference voltage VL is applied. An output terminal of the comparator 1 is connected to a base of a transistor T3 which serves as a second switching means. The transistor has a collector connected to a junction of the capacitor C2 and a resistor R1 and an emitter connected to the positive terminal of the power source E through an impedance Z. Reference symbol D3 indicates a flywheel diode connected in parallel with a coil, in a case where the same coil forms the just-mentioned impedance Z.

Next, operation of the electric-discharge-machining power source constructed as mentioned above will be explained.

In response to the control pulse trains G1 and G2 applied from the control circuit (not shown) to the bases of the transistors T1 and T2, these transistors are repetitively turned ON and OFF. When the transistors are turned ON, the power source voltage VO is applied through the transistors to the gap between the workpiece W and the electrode P. Upon generation of electric discharge between the workpiece and the electrode, the electric discharge current i1, represented by the following equation (3) corresponding to equation (1), flows along a path in a direction from the positive terminal of the power source E to the negative terminal thereof through the transistor T2, workpiece W, electrode P and transistor T1. As shown in FIG. 2B, the discharge current i1 increases linearly with the elapse of time.

$$di1/dt = (VO - VG)/(L1 + L2) \qquad (3)$$

When the transistors T1 and T2 are turned OFF, a return electric current i2 is generated attributable to energy accumulated in the stray inductances L1 and L2, and flows along a path directing from one end of the high-voltage smoothing capacitor C2, connected to the negative terminal of the power source E, to the other end thereof through the diode D1, workpiece W, electrode P and diode D2, so as to charge the capacitor C2. This return electric current i2 (i.e., the discharge electric current in a state where the transistors T1, T2 are turned OFF) decreases in accordance with the following equation (4).

$$di2/dt = (-VC - VG)/(L1 + L2) \qquad (4)$$

In the above equation, VC represents the voltage across the capacitor C2.

The capacitor C2 is rapidly charged by the return electric current i2 up to the charge voltage VC beyond the power source voltage VO. In a state where the charge voltage VC exceeds the power source voltage VO, the differential value di2/dt of the return electric current (i.e., the discharge electric current upon the transistors being turned OFF) represented by equation (4) is larger than the differential value di1/dt of the discharge current when the transistors are turned ON. In other words, the fall of the return electric current i2 is steeper than the rise of the discharge current i1 (FIGS. 2B and 2C). After all, as shown in FIG. 2D, the discharge current i (=i1+i2) has it trianglar waveform which is symmetric with respect to the point of time at which the discharge current assumes its peak value.

During the time the capacitor C2 is charged, the comparator 1 is supplied at its one input terminal with a divided voltage VH, corresponding to the charge voltage VC of the capacitor, from the voltage divider. When the divided voltage VH exceeds the reference voltage VL with increase in the capacitor charge voltage VC (FIG. 2E), the transistor T3 is supplied at its base with a High-level output signal G3 (FIG. 2F) from the comparator 1, and is rendered conductive. The return electric current i2 then flows along a path in a direction from one end of the power-source-voltage smoothing capacitor C1 to the other end thereof through the diode D1, workpiece W, electrode P, diode D2, transistor T3 and impedance Z, so as to charge the capacitor C1. Further, the electric charge accumulated in the capacitor C2 is returned to the capacitor C1 through the transistor T3 and the impedance Z, so as to prevent an excessive increase in the charge voltage of the capacitor C2.

According to the electric-discharge-machining power source of the present invention, it is possible to attain the discharge current having a peak value which is larger than that of the discharge current in the conventional arrangement shown in FIG. 4. This will be explained with reference to FIG. 3.

The arrangement of the embodiment is common to the conventional arrangement in that the electric discharge current increases during a first time period starting at time t1 at which the transistor is turned ON to start the generation of the discharge current and ending at a point in time at which the transistor is turned OFF and the dicharge current has its peak value. The electric discharge current decreases during a second time period starting at the time at which the transistor is turned OFF and ending at time t2 at which the generation of the electric discharge current is terminated. However, in the arrangement of the embodiment wherein the discharge current rapidly falls as shown by a solid line in FIG. 3, the second time period (return-current generation time period) is considerably smaller than the first time period. This is distinct from the case of the conventional arrangement wherein the discharge current falls as shown by a dotted line in FIG. 3 so that the first and second time periods are substantially equal to each other. Accordingly, if the pulsed discharge current having the same pulse width of $\tau$ is generated, the peak value Ip of the discharge current in the arrangement according to the present invention is larger than the peak value Ip' in the conventional arrangement. If the generated discharge current has the same peak value, the pulse width of the discharge current in the apparatus of the present invention is shorter than that in the conventional apparatus.

Meanwhile, a pulsed discharge current, which has a regular pulse width and a regular peak value, can be attained by the use of a control circuit of a type disclosed, e.g., in Japanese Patent Publication No. 44-13195. The central circuit supplies pulse trains G1 and G2 having a reduced variation in pulse width during the electric discharge machining.

We claim:
1. An electric-discharge machining power source including a workpiece, a tool having electrodes, and a discharge circuit, comprising:
   electric power source means;
   first switching means for permitting and prohibiting an application of an electric power voltage from said electric power source means between the workpiece and the tool electrode;
   a first capacitor connected to be charged up to a voltage beyond said electric power voltage;
   a return circuit, connected to said first capacitor, for returning a return electric current to said first capacitor to charge said first capacitor, said return electric current being generated due to presence of a stray inductance from the discharge circuit when the application of said electric power voltage is prohibited by said first switching means;
   discrimination means for generating an output when it is determined that a charge voltage of said first capacitor exceeds a reference voltage;
   a second capacitor connected in parallel with said electric power source means; and
   second switching means for switching in response to the output from said discrimination means and interposedly arranged between said second capacitor and said return circuit and between said first capacitor and said return circuit,
   an electric charge accumulated in said first capacitor is returned to said second capacitor when the charge voltage of said first capacitor exceeds said reference voltage.

* * * * *

UNITED STATES PATENT AND TRADEMARK OFFICE
CERTIFICATE OF CORRECTION

PATENT NO.   : 4,967,054
DATED        : OCTOBER 30, 1990
INVENTOR(S)  : HARUKI OBARA ET AL.

It is certified that error appears in the above-identified patent and that said Letters Patent is hereby corrected as shown below:

Col. 4, line 40, "symmetric" should be --not symmetric--.

Signed and Sealed this

Seventeenth Day of March, 1992

Attest:

HARRY F. MANBECK, JR.

*Attesting Officer*   *Commissioner of Patents and Trademarks*